Aug. 30, 1949.　　　　P. L. SPENCER　　　　2,480,679
PREPARED FOOD ARTICLE AND METHOD OF PREPARING
Filed March 29, 1947

INVENTOR
PERCY L. SPENCER
BY
ATTORNEY

Patented Aug. 30, 1949

2,480,679

UNITED STATES PATENT OFFICE 2,480,679

PREPARED FOOD ARTICLE AND METHOD OF PREPARING

Percy L. Spencer, West Newton, Mass., assignor to Raytheon Manufacturing Company, Boston, Mass., a corporation of Delaware Application March 29, 1947, Serial No. 738,172

12 Claims. (Cl. 99—100)

This invention relates to a prepared food article and a method of preparing the same, and more particularly to a novel method of preparing popcorn for consumption.

The method heretofore used in the preparation of popcorn for consumption involves first husking and then shelling (that is separating the kernels from the cob) an ear of popcorn, which is a type of Indian corn having the scientific name *Zea mays Evereta*. The loose kernels are then sold or distributed as an article of commerce, the cob being discarded or otherwise disposed of separately from the kernels. The loose kernels may be stored for a considerable period of time, as much as a year or even longer, before they find their way to the ultimate consumer or to the person who pops them or prepares them for consumption. When it is desired to prepare the popcorn for consumption, a plurality of loose kernels are placed in a suitable heat-conducting but heat-resistant closed container, and the container and contents are exposed to dry heat emanating from a suitable source, such as an open gas flame. Heat is conducted through the container to the kernels, and after a heat exposure on the order of four to five minutes, the majority of the kernels are popped or everted (that is, turned inside out) by the explosion of the contained moisture, forming a white starchy mass many times the size of the original kernel. The entire mass in the container is then seasoned, as by salt and butter, and is ready for consumption.

There are several drawbacks which exist in the above-described procedure or process. In the first place, shelling the ear requires an additional operation and thus involves some additional expense, which would be done away with if this operation could be eliminated.

Also, due to the fact that the kernels are separated from the cob for such a long period of time before they are finally popped, they have a tendency to dry out, because when separated they can no longer absorb moisture from the cob itself. Again, due to this separation, the kernels tend to lose their original flavor.

In addition, the time required to pop the corn is rather great.

Also, in every mass or group of popcorn kernels prepared by this method there are an appreciable number of kernels which are not popped or everted, even though the rest of the kernels are popped. This result is probably due to the lack of sufficient contained moisture (in this appreciable number) to cause explosion and eversion of such kernels. These unpopped or uneverted kernels remain hard and inedible and, since they are interspersed or mixed with the everted kernels, interfere with the proper or complete edibility and enjoyment of the entire mass of prepared popcorn.

Furthermore, because of the many different handlings involved from ear to prepared popcorn, together with the fact that the loose kernels are ordinarily never stored in a sealed receptacle, the above-described method or process is rather unsatisfactory.

The object of the present invention is to obviate or eliminate the aforementioned drawbacks. This invention contemplates eliminating the shelling of the ear, leaving the kernels attached to the cob until they are everted or popped, popping the corn extremely rapidly, effectively preventing the interspersing of the uneverted kernels with the everted kernels, and providing a very sanitary method of preparing popcorn.

The manner in which these objects are effectuated or carried out will become more apparent as the description proceeds, said description being read in connection with the accompanying drawing, in which.

It has been found that, if the dry heat necessary to pop or evert the kernels of popcorn is provided by the impingement of radio-frequency energy on the corn to be popped while the same is positioned in an energy-filled metallic cavity or enclosure, the kernels can be popped or everted while they are still attached to the cob. In other words, a husked but unshelled ear of popcorn can be placed in a so-called microwave oven, and electromagnetic energy in the microwave region of the frequency spectrum, that is, wave energy whose wavelength is of the order of thirty centimeters or less, can be supplied to said oven to pop or evert the kernels of said ear, thus preparing them for consumption.

eversion can be accomplished in a very short time interval, on the order of 20 to 45 seconds, for example. That this popping of the kernels while on the cob can be done using such an oven, may be due to the following basic difference between the manner of heating by an open flame and by radio-frequency energy in a microwave oven. When an open flame is used, the outside or outer surface or surfaces of the object being heated first become heated by conduction or radiation from the flame, after which the heat proceeds inwardly to the interior of the object mainly by conduction. When an energy-filled microwave oven or enclosure is used, on the other hand, the innermost portion of the body apparently begins to heat immediately on the application of electromagnetic energy, and, in general, the outer portions of the body become heated at a somewhat later time.

It has also been found that water (or moisture) has inherently a high rate of absorption of microwave energy, so that it is heated very rapidly when such energy is applied thereto.

Because of both of the above characteristics or effects, microwave energy may be used very effectively to pop or evert kernels of popcorn while they are still attached to the cob. The moisture contained in the interior of the cob is effectively and quickly heated, this heat being available by conduction in the area of attachment of each kernel to the cob; also, the moisture contained in each kernel is effectively and very rapidly heated, resulting in a very rapid explosion of the moisture and consequent eversion of each kernel.

Figure 1:
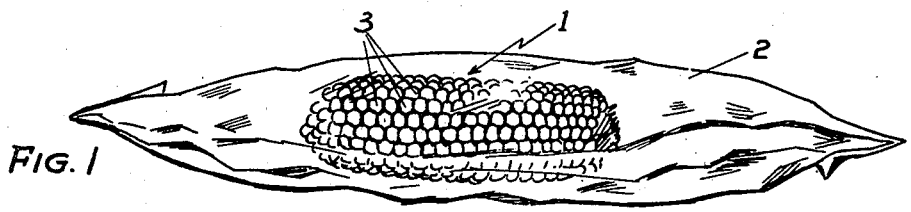
Fig. 1 is an illustration of a package of popcorn according to the invention, ready to be prepared for consumption.

Referring now to the drawing, and more particularly to Fig. 1 thereof, a husked but unshelled ear of raw popcorn 1 is sealed inside a bag 2 which has an interior enclosed volume substantially larger than the volume of ear 1. In this figure, the bag is represented as being transparent, so that ear 1 is visible through said bag.

Bag 2 is made of a sheet material that is flexible and is transparent to electromagnetic energy, such as waxed paper or certain commercial synthetic plastics, but preferably the former. However, one suitable commercial synthetic material is produced in the form of transparent cellulose sheets, made by regenerating cellulose from a solution, extruding it into a coagulating bath, then moisture-proofing the same by lacquering on both sides. Another such synthetic material is a rubber hydrochloride made in the form of thin transparent sheets. Both of these latter materials are transparent to light, as well as to electromagnetic energy, so that the showing of Fig. 1 is justified.

In order to carry out the method of preparing popcorn according to this invention, a husked but unshelled ear 1 of raw popcorn is first provided, after which the raw kernels 3 of said ear are seasoned, as by applying butter and salt thereto, and thereafter ear 1 is sealed in a bag 2 of the type described above. The packaged ear of popcorn is then ready to be placed in a microwave oven, to effectuate explosion and eversion of said kernels.

Figure 2:
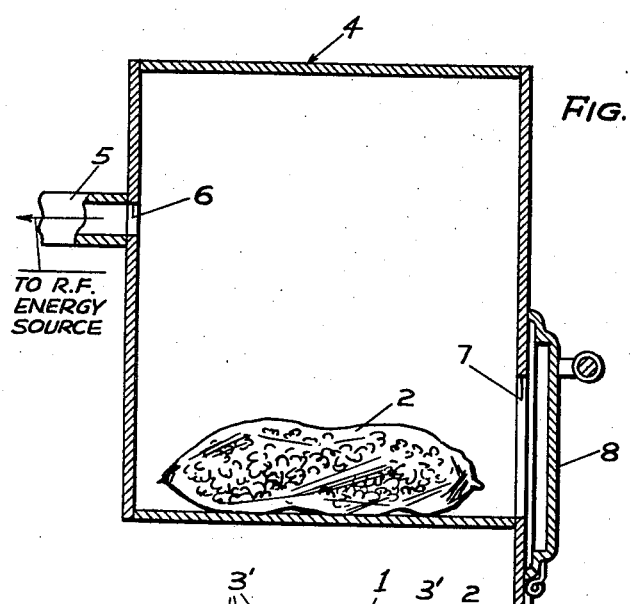
Fig. 2 is a vertical section of a microwave oven utilized to prepare for consumption the popcorn of Fig. 1, showing a prepared package of popcorn therein.

Fig. 2 illustrates such a packaged ear of popcorn, in a microwave open 4, after explosion and eversion of the kernels thereof. The hollow thin-walled metallic enclosure or cavity 4 preferably has the shape of a rectangular parallelopiped, this enclosure serving as the oven of a radio-frequency or microwave heating device. Radio-frequency energy is supplied to the interior of cavity 4 from any suitable source (not shown), for example a magnetron, by means of a hollow waveguide 5 which is coupled to said interior by way of an aperture 6 in the rear wall of said cavity, said aperture being located somewhat above the horizontal midplane of the cavity. An access aperture 7 is provided in the front wall of oven 4, this aperture being closable by means of a hinged metal door 8. When door 8 is in its closed position, it will be seen that the oven 4 is entirely closed, except for the energy supply aperture 6 above described, through which radio-frequency energy in the microwave region of the frequency spectrum is supplied to said cavity. For a more detailed description of a suitable microwave oven, reference is made to the co-pending Hall and Gross application, Serial No. 721,540, filed January 11, 1947.

The packaged ear of popcorn shown in Fig. 1 is placed inside the oven 4, and may, for example, rest on the inner face of the bottom metallic wall of the oven. Thereafter, radio-frequency energy in the microwave region is supplied to enclosure 4 for an interval of time which depends on the size and texture of the particular ear being treated; this interval may lie in a range from 20 to 45 seconds. Such energy impinges on the packaged object lying on the bottom wall of oven 4 and, since bag 2 is transparent to such energy, impinges on the ear of corn inside said bag. This energy is converted to heat in the cob and kernels. The heat results in explosion of the moisture contained in the kernels, popping or everting each kernel to form a white mass many times the size of the original raw kernel 3. It is this increase of size which makes it necessary to use a bag 2 having an enclosed volume substantially larger than the volume of the original ear 1, and causes the bag 2 to have the stuffed appearance illustrated in Fig. 2.

The force of the explosion and eversion of the everted kernels is sufficient to cause a substantial number of such kernels to become completely separated from the cob; these completely separated kernels fly off the cob as they explode, and are caught and retained in bag 2. This is the principal reason for utilizing said bag, for if it were not used, the completely separated kernels would be scattered over the floor or bottom wall of oven 4 and it would be inconvenient to remove them from the oven for consumption; bag 2 does not need, therefore, to be sealed in a vapor-tight or air-tight manner, but only sufficiently tightly to prevent the escape of the completely separated kernels from said bag.

The force of the explosion and eversion is insufficient, however, to cause the complete separation from the cob of an appreciable number of such kernels, so that even though such kernels are everted, they remain attached to said cob and may be removed from the bag along with the cob. However, such kernels are but lightly secured to the cob, so that they may be very easily detached therefrom, as by a light brushing or shaking of the cob.

Although the great majority of the kernels of any one ear are everted by explosion of the contained moisture, there are a few kernels which contain insufficient moisture to explode, so that these kernels remain uneverted after the application of radio-frequency energy to the ear. Since there is no force of explosion or eversion to completely separate these kernels from the cob, or to even partially separate these kernels from the cob, such kernels remain firmly attached to said cob, so that these hard inedible kernels do not become intermixed with the edible everted kernels, but remain attached to the inedible cob and are effectively disposed of when the cob is discarded.

Figure 3:
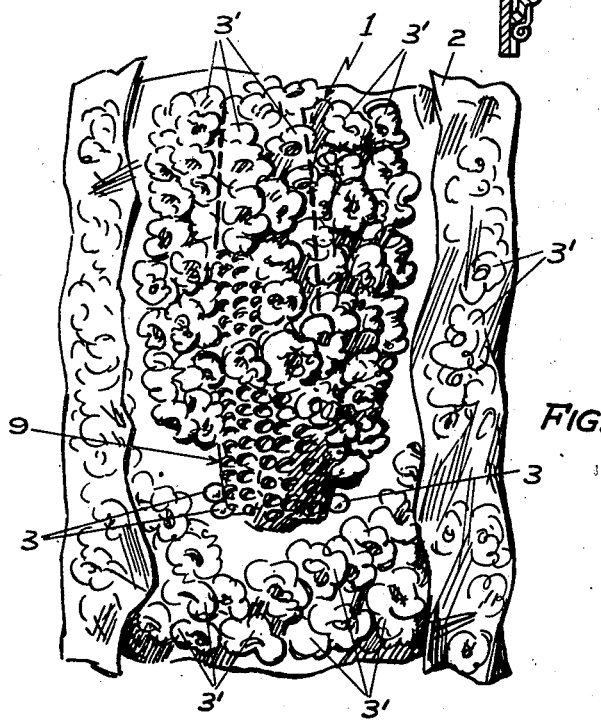
Fig. 3 is a partial view of the package of prepared popcorn of Fig. 2, removed from the oven and broken open to expose the contents thereof.

Now referring to Fig. 3, this figure is a partial view of the package of prepared popcorn, removed from the oven of Fig. 2 and broken open to expose its contents. Bag 2 contains the ear 1, to the cob 9 of which are lightly attached or detachably secured a plurality of everted or popped kernels 3'; a plurality of completely separated everted kernels 3' is contained in bag 2 surrounding ear 1; the few uneverted or hard raw kernels 3 remain firmly attached to cob 9.

Cob 9 may be removed from the bag 2, and if desired, the edible everted kernels 3' which are detachably secured thereto may be eaten directly off said cob, after which the cob may be discarded.

Alternatively, the entire cob 9, along with its detachably secured everted kernels 3', may be discarded, leaving the completely separated kernels 3' for consumption.

Figure 4:
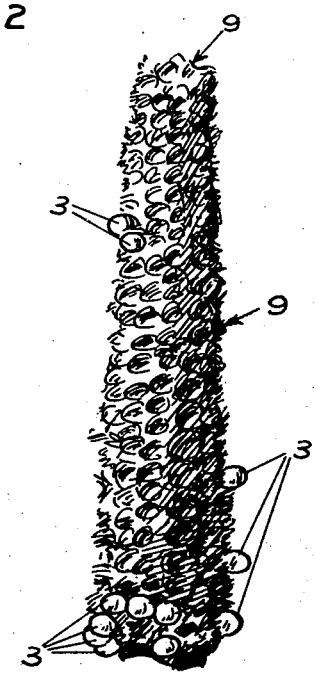
Fig. 4 is a view of a popcorn cob after the kernels thereof have been popped according to the invention, said cob being in condition for discarding.

As a further alternative, the everted kernels 3' which lightly cling to cob 9 may be brushed or shaken therefrom, leaving the cob shown in Fig. 4, to which are attached only the few uneverted or raw kernels 3; this cob may be then discarded.

No matter which of these three alternatives is followed, the few hard inedible uneverted kernels 3 do not become mixed with the soft edible everted kernels 3'. Since the kernels have been seasoned with butter and salt prior to the sealing of the ear 1 in the bag 2, the everted kernels are ready for consumption as soon as the package of popcorn is removed from oven 4.

From all of the above, it will be seen that the objects of the invention have been accomplished. The shelling of the ear is eliminated along with the expense of this operation, since the unshelled ear is used directly for eversion of the kernels. The kernels remain on the cob until they are popped, thus retaining their original moisture and their original flavor; in fact, the prepared popcorn produced by the method of this invention has a flavor all its own which is more "corny" than that of the conventional prepared popcorn. The time required to pop the corn by this method is extremely short. Also, the hard inedible uneverted kernels are kept from becoming intermixed with the everted edible kernels, as explained above, thus entirely eliminating the possibility of interference by such hard kernels with the complete edibility and enjoyment of the popcorn. In addition, the bag 2 remains sealed from the time of husking the ear (assuming that the kernels are seasoned at the same time) until the popcorn is finally eaten, thus providing a very sanitary method of popcorn preparation.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. A method of preparing popcorn for consumption, comprising exposing a husked but unshelled ear of popcorn to electromagnetic wave energy for a time sufficient to evert by explosion at least some of the kernels of said ear.

2. A method of preparing popcorn for consumption, comprising exposing a husked but unshelled ear of popcorn to electromagnetic wave energy for a time sufficient to evert by explosion the majority of the kernels of said ear, thereby causing separation of at least some of the everted kernels from the cob of said ear while leaving the uneverted kernels attached to said cob.

3. A method of preparing popcorn for consumption, comprising exposing a husked but unshelled ear of popcorn to electromagnetic wave energy for a time sufficient to evert by explosion at least some of the kernels of said ear, the force of the explosion and eversion of the everted kernels being sufficient to cause a substantial number of such kernels to become completely separated from the cob of said ear but being insufficient to cause the complete separation from the cob of an appreciable number of such everted kernels.

4. A method of preparing popcorn for consumption, comprising exposing a husked but unshelled ear of popcorn to electromagnetic wave energy for a time sufficient to evert by explosion the majority of the kernels of said ear, the force of the explosion and eversion of the everted kernels being sufficient to cause a substantial number of such kernels to become completely separated from the cob of said ear but being insufficient to cause the complete separation from the cob of an appreciable number of such kernels, the uneverted kernels remaining firmly attached to said cob.

5. A method of preparing popcorn for consumption, comprising sealing a husked but unshelled ear of popcorn in a bag that is transparent to radio-frequency energy, and exposing said bag and contents to radio-frequency energy for a time sufficient to evert by explosion at least some of the kernels of said ear.

6. A method of preparing popcorn for consumption, comprising sealing a husked but unshelled ear of popcorn in a bag that is transparent to radio-frequency energy, and exposing said bag and contents to radio-frequency energy for a time sufficient to evert by explosion the majority of the kernels of said ear, thereby causing separation of at least some of the everted kernels from the cob of said ear while leaving the uneverted kernels attached to said cob, the separated kernels being caught and retained in said bag.

7. A method of preparing popcorn for consumption, comprising sealing a husked but unshelled ear of popcorn in a bag that is transparent to radio-frequency energy, and exposing said bag and contents to radio-frequency energy for a time sufficient to evert by explosion at least some of the kernels of said ear, the force of the explosion and eversion of the everted kernels being sufficient to cause a substantial number of such kernels to become completely separated from the cob of said ear but being insufficient to cause the complete separation from the cob of an appreciable number of such everted kernels, the complemently separated kernels being caught and retained in said bag.

8. A method of preparing popcorn for consumption, comprising applying butter to the kernels of a husked but unshelled ear of popcorn, applying salt to said kernels, thereafter sealing said ear in a bag that is transparent to radio-frequency energy, and exposing said bag and contents to radio-frequency energy for a time sufficient to evert by explosion at least some of the kernels of said ear.

9. A method of preparing popcorn for consumption, comprising applying butter to the kernels of a husked but unshelled ear of popcorn, applying salt to said kernels, thereafter sealing said ear in a bag that is transparent to radio-frequency energy, and exposing said bag and contents to radio-frequency energy for a time sufficient to evert by explosion the majority of the kernels of said ear, thereby causing separation of at least some of the everted kernels from the cob of said ear while leaving the uneverted kernels attached to said cob, the separated kernels being caught and retained in said bag.

10. A method of preparing popcorn for consumption, comprising applying butter to the kernels of a husked but unshelled ear of popcorn, applying salt to said kernels, thereafter sealing said ear in a bag that is transparent to radio-frequency energy, and exposing said bag and contents to radio-frequency energy for a time sufficient to evert by explosion at least some of the kernels of said ear, the force of the explosion and eversion of the everted kernels being sufficient to cause a substantial number of such kernels to become completely separated from the cob of said ear but being insufficient to cause the complete separation from the cob of an appreciable number of such everted kernels, the completely separated kernels being caught and retained in said bag.

11. A prepared article of food comprising a natural popcorn ear having a plurality of the original kernels thereof, everted, and detachably secured to the cob thereof.

12. A packaged edible food product comprising a sealed package containing a natural popcorn ear having a plurality of the original kernels thereof, everted, and detachably secured to the cob thereof.

PERCY L. SPENCER.

REFERENCES CITED

The following references are of record in the file of this patent:

UNITED STATES PATENTS

| Number | Name | Date |
| --- | --- | --- |
| 1,024,637 | Lampert | Apr. 30, 1912 |
| 1,037,382 | Wentworth | Sept. 3, 1912 |
| 1,938,981 | Smith | Dec. 12, 1933 |
| 2,160,730 | Hackett | May 30, 1939 |

Certificate of Correction

Patent No. 2,480,679                                                  August 30, 1949

PERCY L. SPENCER

It is hereby certified that errors appear in the printed specification of the above numbered patent requiring correction as follows:

Column 1, lines 9 and 10, for the name "Zea mays Evereta" read *Zea Mays Everta*; column 2, line 11, for the word "unsatisfactory" read *unsanitary*; line 53, after "can" insert *then*; column 3, line 4, after "oven" strike out the comma; column 6, lines 61 and 62, for "complemently" read *completely*;

and that the said Letters Patent should be read with these corrections therein that the same may conform to the record of the case in the Patent Office.

Signed and sealed this 3rd day of January, A. D. 1950.

[SEAL]

THOMAS F. MURPHY,
*Assistant Commissioner of Patents.*